United States Patent
Chang et al.

(10) Patent No.: US 7,868,962 B2
(45) Date of Patent: Jan. 11, 2011

(54) PIXEL CIRCUIT, PIXEL ARRAY AND METHOD FOR DISCHARGING A CAPACITOR UNIT OF THE PIXEL CIRCUIT

(75) Inventors: Yueh-Ping Chang, Miao-Li (TW); Chao-Yi Hung, Miao-Li (TW); Chih-Chung Liu, Miao-Li (TW)

(73) Assignee: Chimel Innolux Corporation, Miao-Li County (TW)

( * ) Notice: Subject to any disclaimer, the term of this patent is extended or adjusted under 35 U.S.C. 154(b) by 101 days.

(21) Appl. No.: 12/387,040

(22) Filed: Apr. 27, 2009

(65) Prior Publication Data

US 2009/0268113 A1    Oct. 29, 2009

(30) Foreign Application Priority Data

Apr. 25, 2008    (TW) ............... 97115384 A

(51) Int. Cl.
 *G02F 1/135* (2006.01)
(52) U.S. Cl. .......................... 349/48; 349/38
(58) Field of Classification Search .......... 349/38, 349/48
 See application file for complete search history.

(56) References Cited

U.S. PATENT DOCUMENTS 6,404,466 B1   6/2002   Miyahara

*Primary Examiner*—David Nelms
*Assistant Examiner*—Phu Vu
(74) *Attorney, Agent, or Firm*—Wei Te Chung

(57) ABSTRACT

A pixel circuit for a liquid crystal display panel includes a capacitor unit, a voltage-regulating mechanism, a first switching member, and a second switching member. The liquid crystal display panel includes a plurality of scan lines and data lines. The voltage-regulating mechanism is coupled to the first and second liquid crystal capacitors thereby enabling the first and second liquid crystal capacitors to be configured with different voltages when a voltage is applied to the capacitor unit. The first switching member is coupled to the capacitor unit, one of two corresponding scan lines, and one of two corresponding data lines. The second switching member is coupled to the second liquid crystal capacitor, the other of two corresponding scan lines.

10 Claims, 3 Drawing Sheets

```
┌─────────────────────────────────────────────┐
│ charging first and second liquid crystal    │
│ capacitors through activation of one of     │
│ scan lines                                  │
└─────────────────────────────────────────────┘
                      ↓
┌─────────────────────────────────────────────┐
│ deactivating said one of scan lines         │
└─────────────────────────────────────────────┘
                      ↓
┌─────────────────────────────────────────────┐
│ making a connection between the second      │
│ liquid crystal capacitor and one of data    │
│ lines prior to subsequent activation of     │
│ said one of scan lines                      │
└─────────────────────────────────────────────┘
```

FIG. 3

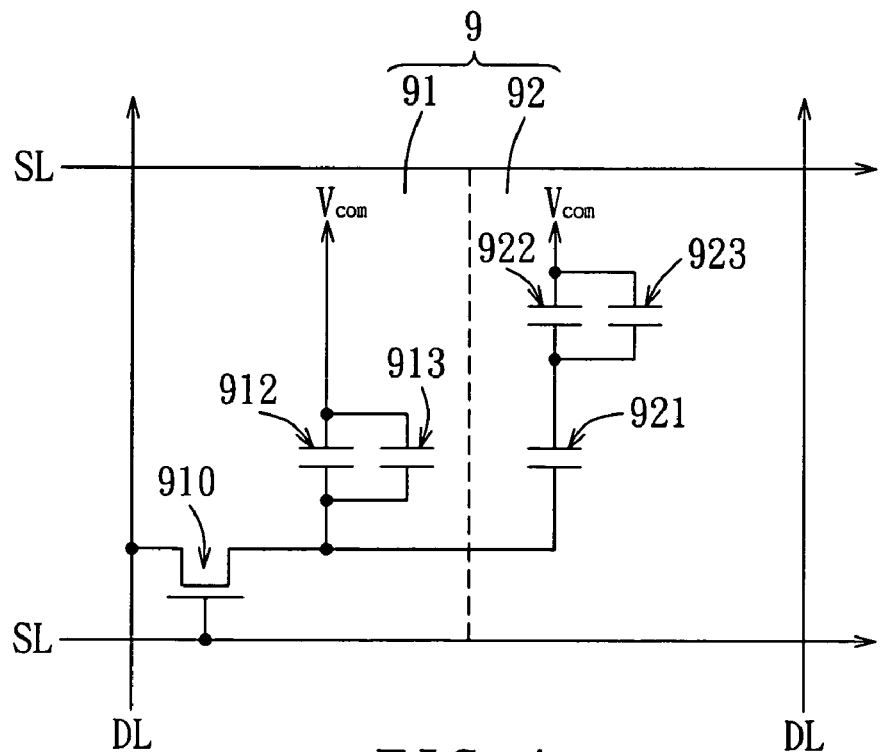

FIG. 4
(RELATED ART)

PIXEL CIRCUIT, PIXEL ARRAY AND METHOD FOR DISCHARGING A CAPACITOR UNIT OF THE PIXEL CIRCUIT

FIELD OF THE DISCLOSURE

The present disclosure relates to pixel circuitry, and more particularly to a pixel circuit including a capacitor unit, an array of pixel areas having pixel circuitry, and a method for discharging the capacitor unit of the pixel circuit.

BACKGROUND

Image display on a liquid crystal display (LCD) panel is controlled by adjusting orientations of liquid crystal molecules within the LCD panel. Each liquid crystal molecule has a birefringent property, which can result in undesired color shift and a relatively narrow viewing angle. To reduce the color shift, a multi-domain vertical alignment (MVA) mode LCD panel may be used. In a 4-domain vertical alignment mode LCD panel, each pixel area (hereinafter, "pixel") of the LCD panel is divided into four regions by formation of a pattern on electrodes of the pixel. The pattern may be of protrusions, or of openings, or a combination of these. The pattern is configured such that the liquid crystal molecules in each region of the pixel can be inclined at a particular angular orientation, with the angular orientations in all four regions being different from each other. Thereby, reduced color shift and a broadened viewing angle can be achieved. However, despite such improvements, the display provided by a 4-domain vertical alignment mode LCD panel may still be considered as unsatisfactory. As such, an 8-domain vertical alignment mode LCD panel may provide superior display. In the 8-domain vertical alignment mode LCD panel, each pixel is divided into two sub-pixel units having different operating voltages. Each of the sub-pixel units is divided into four regions through the aforementioned 4-domain vertical alignment mode LCD panel techniques. The combined effect is to provide eight regions for one pixel, with angular orientations of liquid crystal molecules in all eight regions being different from each other.

Referring to FIG. 4, a conventional 8-domain vertical alignment mode LCD panel includes a plurality of scan lines (SL) and a plurality of data lines (DL), which cross each other and cooperatively define a plurality of pixels 9. In addition to four regions (4-domain) using the aforementioned techniques, each pixel 9 is further divided into first and second pixel sub-regions 91, 92. The first pixel sub-region 91 is provided with a thin film transistor 910 coupled to one of the scan lines (SL) and one of the data lines (DL), and a first capacitor assembly coupled to the thin film transistor 910. The capacitor assembly has a first liquid crystal capacitor 912, and a first storage capacitor 913 coupled to the first liquid crystal capacitor 912 in parallel. The second pixel sub-region 92 is provided with a second liquid crystal capacitor 922, a second storage capacitor 923 coupled to the second liquid crystal capacitor 922 in parallel, and a coupling capacitor 921 coupled to the second liquid crystal capacitor 922. The assembly of the second liquid crystal capacitor 922, the second storage capacitor 923 and the coupling capacitor 921 is coupled to the assembly of the first liquid crystal capacitor 912 and the first storage capacitor 913 in parallel. When the thin film transistor 910 is activated by the scan line (SL), a voltage signal is transmitted through the data line (DL) to charge the first liquid crystal capacitor 912 and the first storage capacitor 913, and to charge the second liquid crystal capacitor 922 and the second storage capacitor 923 through the coupling capacitor 921. Due to the use of the coupling capacitor 921, the first and second liquid crystal capacitors 912, 922 exhibit different voltages during charging. As a consequence, the twisted angles of the liquid crystal molecules of the first liquid crystal capacitor 912 in the first pixel sub-region 91 differ from those of the liquid crystal molecules of the second liquid crystal capacitor 922 in the second pixel sub-region 92. Thereby, an 8-domain vertical alignment mode display is realized.

The conventional 8-domain vertical alignment mode LCD panel is disadvantageous in that residual charges in the second liquid crystal capacitor 922 resulting from previous charging cannot be sufficiently discharged prior to subsequent charging of the first and second liquid crystal capacitors 912, 922, thereby resulting in image sticking and reduced display quality.

Therefore, a means and a method are desirable to overcome the limitations described.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

FIG. 3 is a block diagram of an exemplary method for discharging a capacitor unit of any one of the pixel circuits of FIG. 1.

FIG. 4 is a diagram of a pixel circuit of a conventional liquid crystal display panel.

DETAILED DESCRIPTION

Reference will now be made to the drawings to describe various embodiments in detail.

Figure 1:
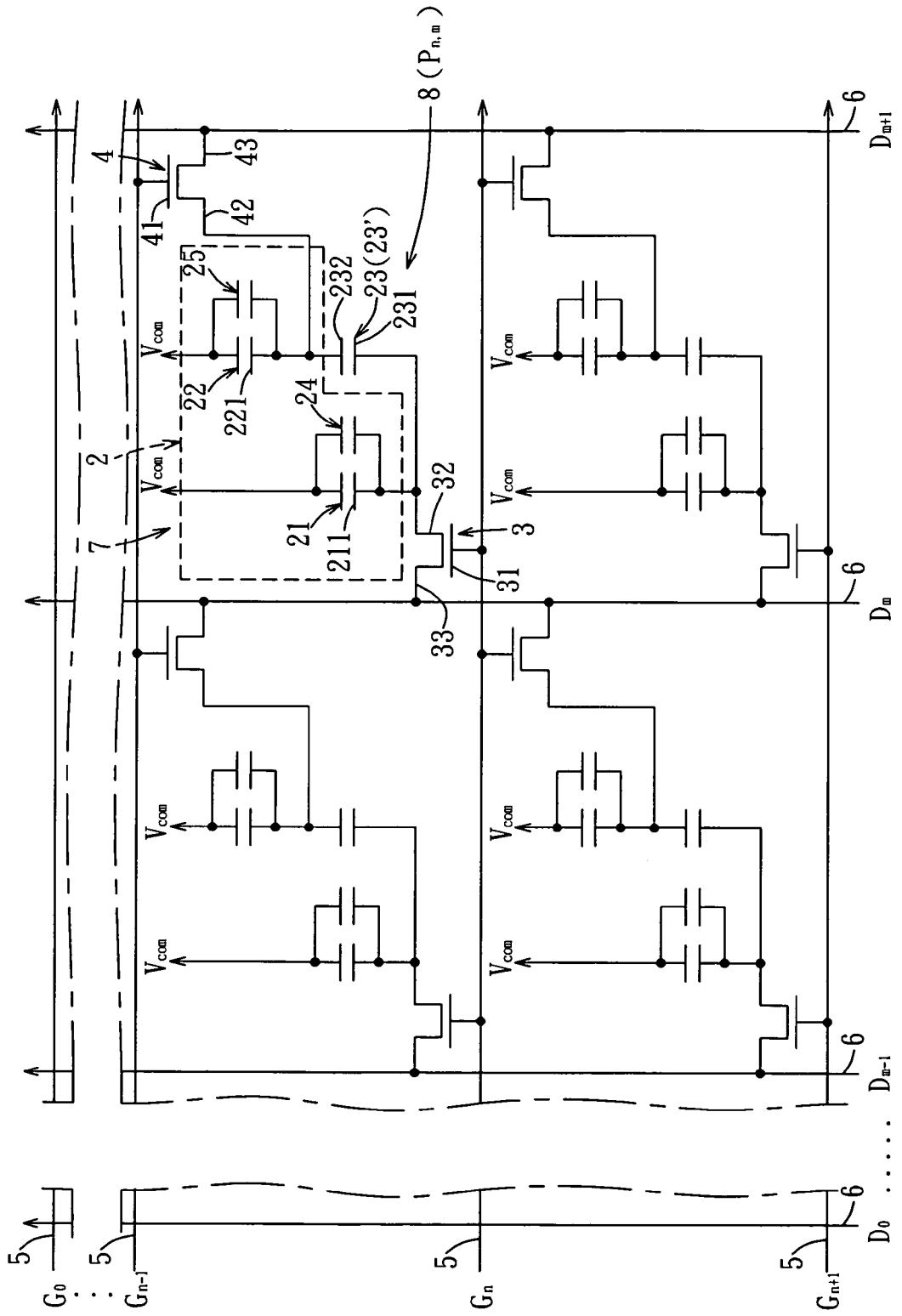
FIG. 1 is an abbreviated circuit diagram of a pixel area array of an exemplary liquid crystal display panel of the present disclosure, showing a plurality of pixel circuits.

Referring to FIG. 1, a pixel array of a liquid crystal display panel includes a plurality of scan lines 5, a plurality of data lines 6 cooperating with the scan lines 5 to define a plurality of pixel regions 7, and a plurality of pixel circuits 8 provided in the pixel regions 7, respectively. Each of the pixel circuits 8 includes a capacitor unit 2, a first switching member 3, and a second switching member 4.

The capacitor unit 2 includes first and second liquid crystal capacitors 21, 22, and a voltage-regulating mechanism 23 coupled to the first and second liquid crystal capacitors 21, 22 to permit the first and second liquid crystal capacitors 21, 22 to be configured with (i.e., carry) different voltages when a voltage is applied to the capacitor unit 2.

The first switching member 3 is coupled to the capacitor unit 2, one of two corresponding scan lines 5 that are coupled to the pixel circuit 8, and one of two corresponding data lines 6 that are coupled to the pixel circuit 8. The first switching member 3 connects said one of two corresponding data lines 6 and the capacitor unit 2 when said one of two corresponding scan lines 5 is activated.

The second switching member 4 is coupled to the second liquid crystal capacitor 22, the other of the two corresponding scan lines 5 that are coupled to the pixel circuit 8, and the other of the two corresponding data lines 6 that are coupled to the pixel circuit 8. The second switching member 4 connects said other of the two corresponding data lines 6 and the second liquid crystal capacitor 22 when said other of the two corresponding scan lines 5 is activated.

Each of the first and second liquid crystal capacitors 21, 22 includes a pixel electrode 211, 221, respectively. The first switching member 3 is a thin film transistor, and has a drain electrode 32 connected to the pixel electrode 211 of the first liquid crystal capacitor 21. The second switching member 4 is a thin film transistor, and has a drain electrode 42 connected to the pixel electrode 221 of the second liquid crystal capacitor 22. The voltage-regulating mechanism 23 is in the form of a coupling capacitor 23' connected to the second liquid crystal capacitor 22 in series. The assembly of the coupling capacitor 23' and the second liquid crystal capacitor 22 is connected to the first liquid crystal capacitor 21 in parallel. The coupling capacitor 23' has a first electrode 231 connected to the drain electrode 32 of the first switching member 3, and a second electrode 232 connected to the drain electrode 42 of the second switching member 4. As such, the use of the coupling capacitor 23' permits a proportional relationship between the voltages of the first and second liquid crystal capacitors 21, 22 when voltage is applied to the capacitor unit 2 through either one of the two corresponding scan lines 5.

The first switching member 3 further has a gate electrode 31 connected to said one of two corresponding scan lines 5, and a source electrode 33 connected to said one of two corresponding data lines 6. The second switching member 4 further has a gate electrode 41 connected to said other of the two corresponding scan lines 5, and a source electrode 43 connected to said other of the two corresponding data lines 6. Each of the first and second liquid crystal capacitors 21, 22 further includes a second electrode connected to a common line (not shown) of the liquid crystal display panel, and a number of liquid crystal molecules disposed between the pixel electrodes 211, 221 and the second electrode.

The capacitor unit 2 further includes a first storage capacitor 24 coupled to the first liquid crystal capacitor 21 in parallel, for maintaining the voltage of the first liquid crystal capacitor 21 for a period of time, and a second storage capacitor 25 coupled to the second liquid crystal capacitor 22 in parallel, for maintaining the voltage of the second liquid crystal capacitor 22 for a period of time.

Each pixel circuit 8 defines a pixel of the liquid crystal display panel. The pixel can be structurally divided into four regions of liquid crystal molecules (not shown). The liquid crystal molecules in all four regions have different orientations from each other, according to conventional means, such as the aforementioned techniques. Thereby, the liquid crystal display panel can exhibit multi-domain vertical alignment mode characteristics.

In operation, the scan lines 5 (G0–Gn+1) are sequentially activated so as to transmit the voltage signals of the data lines 6 (D0–Dm+1) to the first and second liquid crystal capacitors 21, 22 of the capacitor units 2 of the corresponding pixel regions 7, thereby enabling a display (not shown) on a screen (not shown) of the liquid crystal display panel. As an example, in operation of one of the pixel circuits 8 (labeled as Pn,m in FIG. 1), before a new frame is to be displayed, the second switching member 4 is turned on through activation of the corresponding scan line 5 (labeled as Gn–1 in FIG. 1) prior to activation of a subsequent scan line 5 (labeled as Gn in FIG. 1) next to the scan line 5 (Gn–1). Thereby, stored charges resulting from generation of the previous frame are released from the second liquid crystal capacitor 22. When the subsequent scan line 5 (Gn) is subsequently activated, the first switching member 3 is turned on to permit application of a voltage to the first and second liquid crystal capacitors 21, 22 through the corresponding data line 6 (labeled as Dm in FIG. 1), which results in displaying of the new frame on the screen. Since the residual charges in the second liquid crystal capacitor 22 are discharged, the aforesaid image sticking phenomena that may otherwise occur in each new frame can be avoided. It is noted that if the gate electrode 41 of the second switching member 4 were connected to and controlled by the subsequent scan line 5 (Gn) for discharging purposes, the second liquid crystal capacitor 22 would be charged by the data line 6 (Dm) and the data line 6 (Dm+1) at the same time.

As such, the second liquid crystal capacitor 22 could not reflect solely the output signal of the data line 6 (Dm) as desired when the subsequent scan line 5 (Gn) is activated.

Figure 2:
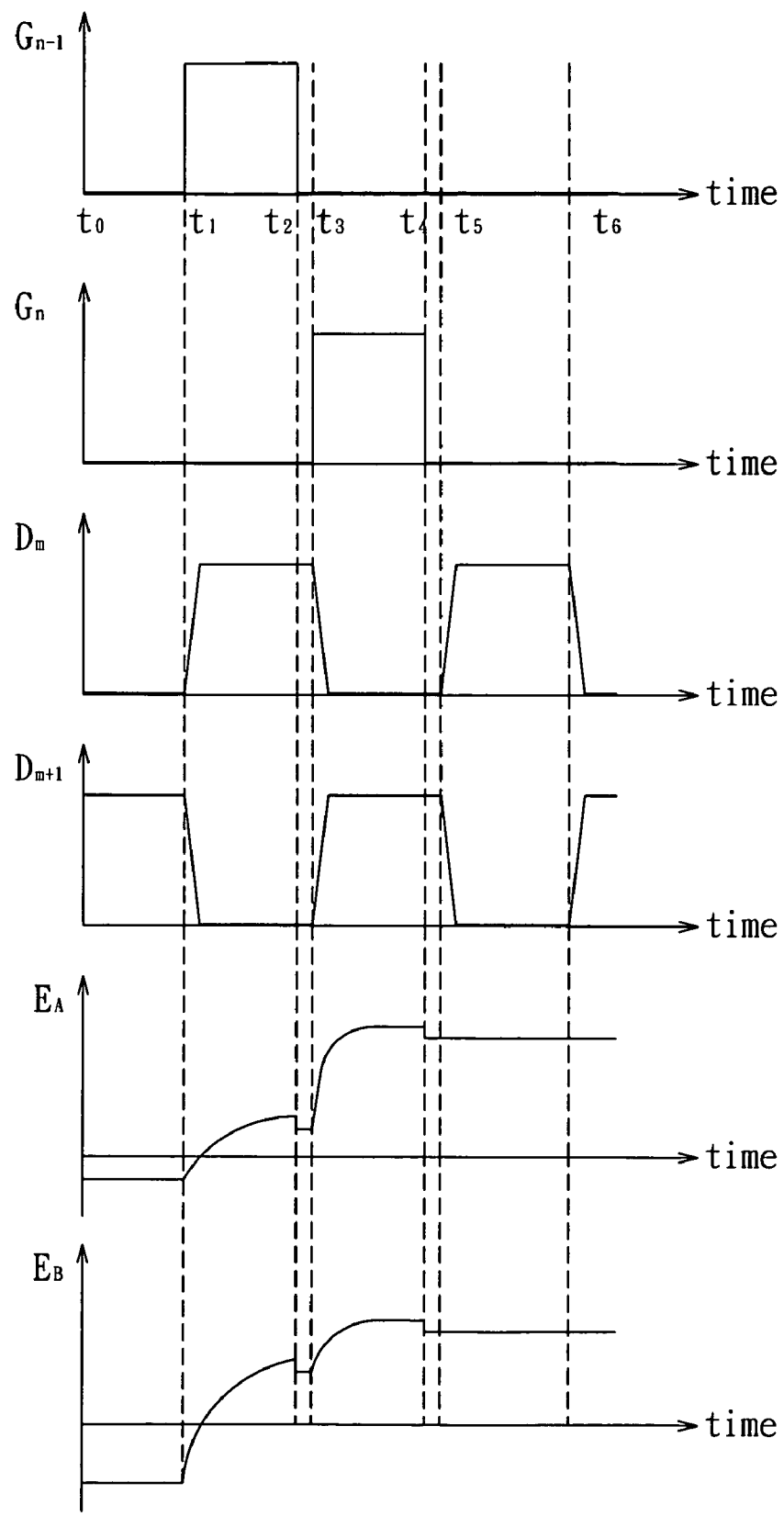
FIG. 2 is a series of timing charts (waveform diagrams) showing operation of any one of the pixel circuits of FIG. 1.

FIG. 2 is a series of timing charts, showing a waveform of electrical potential (EA) of the pixel electrode 211 of the first liquid crystal capacitor 21 and a waveform of electrical potential (EB) of the pixel electrode 221 of the second liquid crystal capacitor 22 during operation of the pixel circuit 8 (Pn,m). The electrical potentials (EA, EB) change from a current frame to a new frame on the screen of the liquid crystal display panel, as time progresses.

As shown in FIG. 2, from t0-t1, since the scan line 5 (Gn–1) has not been activated, the pixel electrodes 211, 221 of the first and second liquid crystal capacitors 21, 22 are respectively held at certain electrical potentials (EA, EB) sufficient to maintain the image of the current frame by the first and second storage capacitors 24, 25.

From t1-t2, the scan line 5 (Gn–1) is activated to turn on the second switching member 4, which results in an electrical connection between the second liquid crystal capacitor 22 and the data line 6 (Dm+1). This, in turn, results in discharge from the second liquid crystal capacitor 22 through the data line 6 (Dm+1) at this time. In addition, the electrical potentials (EA, EB) of the pixel electrodes 211, 221 of the first and second liquid crystal capacitors 21, 22 are increased at this time.

From t2-t3, the scan line 5 (Gn–1) is deactivated, and the electrical potentials (EA, EB) of the pixel electrodes 211, 221 of the first and second liquid crystal capacitors 21, 22 drop slightly due the presence of a parasitic capacitance (not shown) of the second switching member 4, and are respectively held at certain levels by the first and second storage capacitors 24, 25.

From t3-t4, the scan line 5 (Gn) next to the previous scan line 5 (Gn–1) is activated to turn on the first switching member 3, which results in an electrical connection between the capacitor unit 2 and the data line 6 (Dm), thereby permitting an output signal of the data line 6 (Dm) to be transmitted to the electrical potentials (EA, EB) of the pixel electrodes 211, 221 of the first and second liquid crystal capacitors 21, 22. As a consequence, the electrical potentials (EA, EB) of the pixel electrodes 211, 221 of the first and second liquid crystal capacitors 21, 22 are respectively increased to desired levels, thereby permitting change of the current frame to the new frame on the screen.

From t4-t5, the scan line 5 (Gn) is deactivated, and the electrical potentials (EA, EB) of the pixel electrodes 211, 221 of the first and second liquid crystal capacitors 21, 22 drop slightly due the presence of a parasitic capacitance (not shown) of the first switching member 3, and are respectively held at levels sufficient to maintain displaying of the new frame by the first and second storage capacitors 24, 25.

As shown in FIG. 3, also disclosed is a method for discharging a capacitor unit 2 of each pixel circuit 8 of a liquid crystal display panel. The method includes: configuring the first and second liquid crystal capacitors 21, 22 to carry different voltages by employing a voltage-regulating mechanism 23, and charging the first and second liquid crystal capacitors 21, 22 through activation of one of a plurality of scan lines 5 coupled to a pixel circuit 8; deactivating said one scan line 5; and connecting the second liquid crystal capacitor 22 and one data line 6 coupled to the pixel circuit 8 prior to subsequent activation of said one scan line 5, thereby enabling discharge of the second liquid crystal capacitor 22 prior to subsequent charging of the first and second liquid crystal capacitors 21, 22. It is noted that the pixel circuit 8 of FIG. 1 used in the method is only for illustrative purposes; and discharge of the second liquid crystal capacitor 22 can be conducted in any manner sufficient to mitigate or even eliminate image sticking while maintaining the performance of each pixel circuit 8.

In the pixel array of the liquid crystal display panel, by making an electrical connection between the second liquid crystal capacitor 22 of each pixel circuit 8 and one of the data lines 6 prior to subsequent activation of the scan line 5 coupled to the pixel circuit 8, image sticking can be considerably mitigated or even eliminated.

It is to be understood that even though numerous characteristics and advantages of the present embodiments have been set forth in the foregoing description, together with details of the structures and functions of the embodiments, the disclosure is illustrative only; and that changes may be made in detail, especially in matters of shape, size, and arrangement of parts, within the principles of the embodiments, to the full extent indicated by the broad general meaning of the terms in which the appended claims are expressed.

What is claimed is:

1. A pixel circuit for a liquid crystal display panel, the liquid crystal display panel including a plurality of scan lines and data lines, the pixel circuit comprising:
    a capacitor unit including a first crystal capacitor and a second liquid crystal capacitor;
    a voltage-regulating mechanism coupled to the first and second liquid crystal capacitors thereby enabling the first and second liquid crystal capacitors to be configured with different voltages when a voltage is applied to the capacitor unit;
    a first switching member coupled to the capacitor unit and coupled to one of two corresponding scan lines coupled to the pixel circuit and one of two corresponding data lines coupled to the pixel circuit, the first switching member capable of connecting said one of two corresponding data lines and the capacitor unit when said one of two corresponding scan lines is activated; and
    a second switching member coupled to the second liquid crystal capacitor and coupled to the other corresponding scan line and the other corresponding data line, the second switching member capable of connecting said other corresponding data line and the second liquid crystal capacitor when said other corresponding scan line is activated.

2. The pixel circuit of claim 1, wherein each of the first and second liquid crystal capacitors comprises a pixel electrode, the first switching member comprises a thin film transistor having a drain electrode connected to the pixel electrode of the first liquid crystal capacitor, and the second switching member comprises a thin film transistor having a drain electrode connected to the pixel electrode of the second liquid crystal capacitor.

3. The pixel circuit of claim 2, wherein the voltage-regulating mechanism comprises a coupling capacitor connected to the second liquid crystal capacitor in series, wherein the assembly of the coupling capacitor and the second liquid crystal capacitor is connected to the first liquid crystal capacitor in parallel.

4. The pixel circuit of claim 3, wherein the coupling capacitor has a first electrode connected to the drain electrode of the first switching member and a second electrode connected to the drain electrode of the second switching member.

5. The pixel circuit of claim 2, wherein the capacitor unit further includes a first storage capacitor coupled to the first liquid crystal capacitor in parallel, and a second storage capacitor coupled to the second liquid crystal capacitor in parallel.

6. The pixel circuit of claim 2, wherein the first switching member further comprises a gate electrode connected to said one of two corresponding scan lines, and a source electrode connected to said one of two corresponding data lines, and the second switching member further comprises a gate electrode connected to said other corresponding scan line, and a source electrode connected to said other corresponding data line.

7. A pixel array for a liquid crystal display panel, the pixel array comprising:
    a plurality of scan lines;
    a plurality of data lines cooperating with the plurality of scan lines to define a plurality of pixel regions; and
    a plurality of pixel circuits provided in the pixel regions, respectively, each of the pixel circuits including:
    a capacitor unit including a first liquid crystal capacitor and a second liquid crystal capacitor,
    a voltage-regulating mechanism coupled to the first and second liquid crystal capacitors thereby enabling the first and second liquid crystal capacitors to be configured with different voltages when a voltage is applied to the capacitor unit,
    a first switching member coupled to the capacitor unit, one of two corresponding scan lines coupled to the pixel circuit, and one of two corresponding data lines coupled to the pixel circuit, the first switching member capable of connecting said one of two corresponding data lines and the capacitor unit when said one of two corresponding scan lines is activated, and
    a second switching member coupled to the second liquid crystal capacitor, the other corresponding scan line, and the other corresponding data line, the second switching member capable of connecting said other corresponding data line and the second liquid crystal capacitor when said other corresponding scan line is activated.

8. The pixel array of claim 7, wherein each of the first and second liquid crystal capacitors comprises a pixel electrode, wherein the first switching member comprises a thin film transistor comprising a drain electrode connected to the pixel electrode of the first liquid crystal capacitor, and the second switching member comprises a thin film transistor comprising a drain electrode connected to the pixel electrode of the second liquid crystal capacitor.

9. A method for discharging a capacitor unit of a pixel circuit of a liquid crystal display panel, the method comprising:
    configuring a first liquid crystal capacitor and a second liquid crystal capacitor of the capacitor unit to carry different voltages by coupling a voltage-regulating mechanism to the first and second liquid crystal capacitors;
    charging the first and second liquid crystal capacitors through activation of one scan line of the liquid crystal display panel coupled to the pixel circuit, whereby the first and second liquid crystal capacitors carry different voltages;
    deactivating said one scan line; and
    connecting the second liquid crystal capacitor to one data line of the liquid crystal display panel coupled to the pixel circuit prior to subsequent activation of said one scan line, thereby enabling discharge of the second liquid crystal capacitor prior to subsequent charging of the first and second liquid crystal capacitors.

10. The method of claim 9, wherein connection of the second liquid crystal capacitor to said one data line of the liquid crystal display panel to enable the discharging operation is conducted through a thin film transistor.

* * * * *

UNITED STATES PATENT AND TRADEMARK OFFICE
CERTIFICATE OF CORRECTION

| | |
|---|---|
| PATENT NO. | : 7,868,962 B2 |
| APPLICATION NO. | : 12/387040 |
| DATED | : January 11, 2011 |
| INVENTOR(S) | : Yueh-Ping Chang, Chao-Yi Hung and Chih-Chung Liu |

It is certified that error appears in the above-identified patent and that said Letters Patent is hereby corrected as shown below:

Title page, item (73) Assignees:

should read as follows: Chimei Innolux Corporation, Miao-Li County (TW).

Signed and Sealed this
Seventh Day of June, 2011

David J. Kappos
*Director of the United States Patent and Trademark Office*